US006456031B1

(12) United States Patent
Gallegos-Lopez et al.

(10) Patent No.: US 6,456,031 B1
(45) Date of Patent: Sep. 24, 2002

(54) ROTOR POSITION ESTIMATION FOR SWITCHED RELUCTANCE MACHINES

(75) Inventors: Gabriel Gallegos-Lopez, Alexandria; Kaushik Rajashekara; James E. Walters, both of Carmel, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/765,745

(22) Filed: Jan. 19, 2001

(51) Int. Cl.⁷ ................................................. H02F 8/00
(52) U.S. Cl. ........................ 318/701; 318/715; 318/721
(58) Field of Search ................................. 318/701, 254, 318/138, 439, 715, 721

(56) References Cited

U.S. PATENT DOCUMENTS

| | | | | |
|---|---|---|---|---|
| 5,097,190 A | | 3/1992 | Lyons et al. ................. | 318/701 |
| 5,140,243 A | * | 8/1992 | Lyons et al. ................. | 318/701 |
| 5,467,025 A | * | 11/1995 | Ray ........................... | 324/772 |
| 5,841,262 A | * | 11/1998 | Tang .......................... | 318/701 |
| 5,920,175 A | | 7/1999 | Jones et al. ................. | 318/701 |
| 5,982,117 A | * | 11/1999 | Taylor et al. ................ | 318/254 |
| 6,150,778 A | * | 11/2000 | Moris ......................... | 318/254 |
| 6,246,193 B1 | * | 6/2001 | Dister ........................ | 318/254 |
| 6,288,514 B1 | * | 9/2001 | Direnzo ...................... | 318/701 |
| 6,291,949 B1 | * | 9/2001 | Green ......................... | 318/254 |

OTHER PUBLICATIONS

Flux/Current Methods for SRM Rotor Position Estimation J.P. Lyons, S.R. MacMinn and M.A. Preston Industry Applications Society Annual Meeting, 1991, Conference.

* cited by examiner

Primary Examiner—Robert E. Nappi
Assistant Examiner—Rita Leykin
(74) Attorney, Agent, or Firm—Margaret A. Dobrowitsky

(57) ABSTRACT

Method and system for estimating rotor position of a switched reluctance machine is provided. The method allows for estimating flux linkage across a respective phase of the machine. The method allows for measuring of magnetization curves at aligned and unaligned positions of the machine. The method further allows for computing magnetization reference data between the aligned and unaligned positions. A storing step allows for storing rotor position data based on the magnetization reference data. The stored rotor position data is indicative of rotor position variation as a function of phase current. A relating step allows to relate the estimated flux linkage to the magnetization reference data to determine, for a respective phase current, correspondence of the estimated flux linkage relative to the magnetization reference data. A retrieving step allows for retrieving stored rotor position data when said correspondence is determined. The retrieved rotor position data is the estimate of rotor position of the switch reluctance machine corresponding to the respective phase current.

50 Claims, 3 Drawing Sheets

ROTOR POSITION ESTIMATION FOR SWITCHED RELUCTANCE MACHINES

BACKGROUND OF THE INVENTION

The present invention is generally related to control for electromechanical machines, and, more particularly, the present invention is related to sensorless control techniques for estimating rotor position in a switched reluctance machine.

In order to properly operate a switched reluctance machine, it is generally necessary to determine the rotor position in order to appropriately commutate the currents flowing in the respective phase windings of the machine. Various devices may be used to obtain a measure of rotor position, e.g., resolvers, particularly when high resolution is required. Other devices that may be used to determine rotor position include encoders or Hall sensors. However, such devices and required associated circuitry add incremental costs and may become sources of single point failure.

In order to eliminate the need for position sensors, such as resolvers, encoders, or Hall sensors, sensorless operational techniques have been developed. Many of such techniques, however, suffer from lack of consistency due to their failure to account for machine-to-machine variation when applied to a large number of machines. Further, in some cases, such techniques require time-consuming and burdensome individual calibration of the controller configured to execute such techniques in any given machine.

The present invention proposes a new technique for rotor position estimation for switched reluctance machines. The proposed technique uses the respective magnetization curves of the machine for rotor position estimation, and its inputs are measured current and estimated flux linkage. One desirable feature of the proposed technique is that it measures the magnetization data of the machine online and approximates the magnetization data in a substantially linear manner. Hence the loss of consistency from one machine to another in high volume manufacturing is not a concern. Also, it is not necessary to calibrate the controller for each machine separately.

BRIEF SUMMARY OF THE INVENTION

Generally speaking, the present invention fulfills the foregoing needs by providing in one aspect thereof a method for estimating rotor position of a switched reluctance machine. The method allows for measuring magnetization curve at respective aligned and unaligned positions of the machine. The method allows for estimating flux-linkage across a respective phase of the machine. The method further allows for computing magnetization reference data between the aligned and unaligned positions. A storing step allows for storing rotor position data based on the magnetization reference data. The stored rotor position data is indicative of rotor position variation as a function of phase current. A relating step allows to relate the estimated flux linkage to the magnetization reference data to determine, for a respective phase current, correspondence of the estimated flux linkage relative to the magnetization reference data. A retrieving step allows for retrieving stored rotor position data when said correspondence is determined. The retrieved rotor position data is the estimate of rotor position of the switch reluctance machine corresponding to the respective phase current.

In another aspect thereof, the method allows for estimating multiple rotor positions by estimating an initial rotor position using the estimated flux-linkage and phase current. The initial rotor position is compensated as a function of current to obtain the final estimated position. In yet another aspect thereof, the method uses the magnetization curve at the aligned position as a reference to run the machine sensorless and measure the magnetization curve at the unaligned position. Alternatively, the method may estimate the aligned position by detecting a sign change in the derivative of the flux-linkage or when the value of such derivative is within a predefined range about zero.

The present invention further fulfills the forgoing needs by providing in another aspect thereof, a system for estimating rotor position of a switched reluctance machine. The system includes a processor for measuring magnetization curve at aligned and unaligned positions of the machine. The system includes a flux linkage estimator configured to estimate flux linkage across a respective phase of the machine. The system further includes a processor configured to compute magnetization reference data between the aligned and unaligned positions of the machine. Memory is provided to store rotor position data based on the magnetization reference data. The stored rotor position data is indicative of rotor position variation as a function of phase current. A flux-relating module is configured to relate the estimated flux linkage to said magnetization reference data to determine, for a respective phase current, correspondence of the estimated flux linkage relative to the magnetization reference data. A data retrieval unit is coupled to said memory to retrieve stored rotor position data when that correspondence is determined. The retrieved rotor position data comprises the estimate of rotor position of the switch reluctance machine corresponding to the respective phase current.

In one aspect thereof, the system allows for estimating multiple rotor positions by estimating an initial rotor position using the estimated flux-linkage and phase current. The initial rotor position is compensated as a function of current to obtain the final estimated position. In another aspect thereof, the system uses the magnetization curve at aligned position as a reference to run the machine sensorless and measure the magnetization curve at unaligned position. Alternatively, the system estimates the aligned position by detecting the change of sign of the derivative of the flux-linkage or when it becomes zero.

DETAILED DESCRIPTION OF THE INVENTION

The present invention proposes a new technique for rotor position estimation for switched reluctance machines. The technique uses the magnetization curves of the machine that are a function of measured current and estimated flux-linkage for rotor position estimation.

The principles of the present invention are described in the context of an exemplary algorithm, and, for the sake of facilitating understanding, such algorithm is explained in three conceptual stages as follows:

First stage: Allows for measuring the magnetization curve of a polyphase switched reluctance machine at an aligned phase position, i.e., when the stator poles of that phase are aligned with the respective rotor poles of the machine. This first stage may be executed as follows:

Energize one of the machine phases to provide alignment to that phase.

Apply an energization signal to the phase, e.g., a voltage pulse. Measure and store the phase current and estimated flux-linkage by eq. (1). The phase impedance R may be estimated by calculating the applied voltage and the phase current (V/i) in the steady state. The phase current and the flux-linkage represent the magnetization curve at the aligned position. In one exemplary embodiment, one may execute this step several times and then calculate the average of the magnetization curve at the aligned position.

$$\psi_e = \int (V - R^* i) dt \qquad (1)$$

Figure 1:
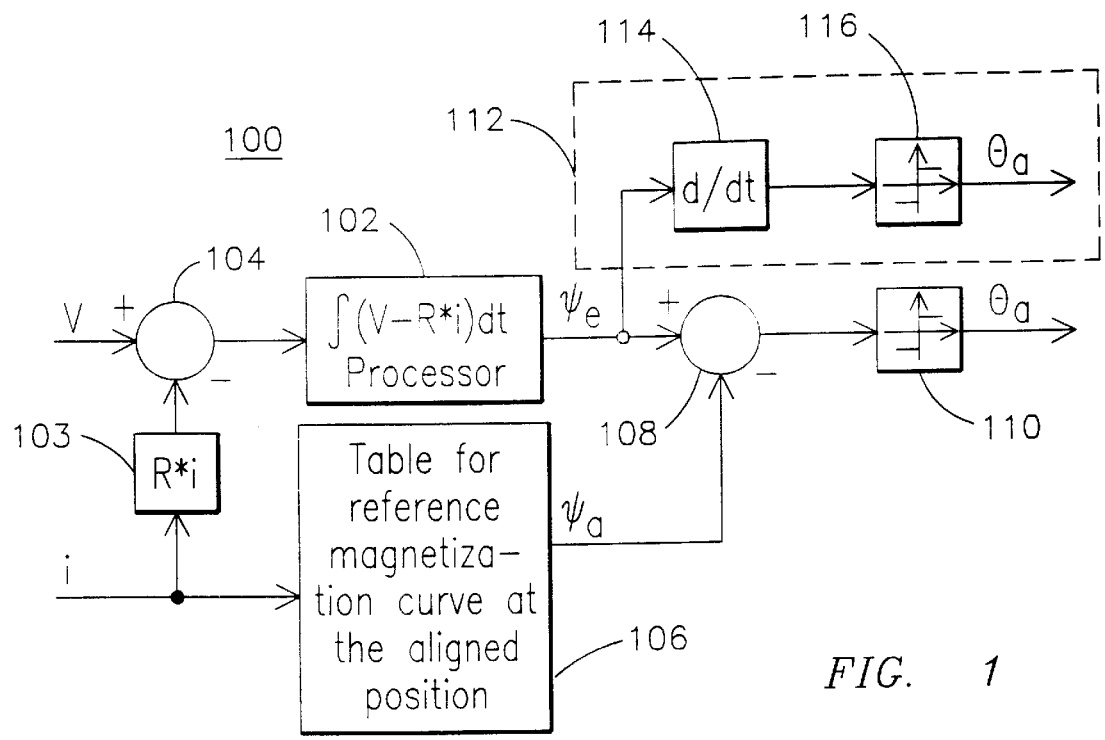
FIG. 1 is a block diagram representation of exemplary techniques for estimating flux linkage at an aligned position in a switched reluctance machine.

Second stage: This stage may be executed while running the machine sensorless using the magnetization curve at the aligned position as a position reference. FIG. 1 shows an exemplary block diagram 100 for conceptualizing the estimation of the aligned position. This stage may be executed as follows:

By way of example, any phase to be energized next may be identified based on the direction of rotation set by the firing sequence commanded by a machine controller. When the phase is energized, the phase current is measured, and the flux-linkage $\psi_e$ is estimated in a processor 102 configured to execute eq. (1). As shown in FIG. 1, processor 102 mathematically integrates the difference between the applied voltage, e.g., voltage V, and the voltage that develops across the impedance R, e.g., voltage R*i, such as may be obtained from a voltage-estimating device 103, such as a device that multiplies the phase current by impedance R. The difference V−R*i may be obtained from a summer 104 having respective non-inverting and inverting terminals to respectively receive the applied voltage and the voltage across the impedance. For a given current, the corresponding reference flux-linkage $\psi_a$ at the aligned position may be retrieved from a memory device, e.g., a look-up table 106, comprising the values of the reference flux-linkage derived in the above-described first stage. The difference $\psi_e - \psi_a$, as may be obtained from a summer 108, is used to estimate the aligned position $\theta_a$. As will be understood by those skilled in the art, initially the value of the difference $\psi_e - \psi_a$ may be negative. When the aligned position is reached, the value of the difference $\psi_e - \psi_a$ approaches a sufficiently small value, e.g., zero, so that a pulse is generated by a comparator device 110 configured to generate the pulse upon the value of the difference $\psi_e - \psi_a$ reaching a predefined range about zero. At this point that phase is turned off and the next phase in the energizing sequence is turned on.

Block 112 illustrates an alternative embodiment for estimating the aligned position. In this embodiment, a differentiator 114 receives the estimated flux-linkage $\psi_e$, and, when the aligned position is reached, the slope of the flux-linkage would become zero, and change sign when the aligned position has been passed, and this would cause a comparator device 116 to be triggered and generate the pulse.

As suggested above, regardless of the specific methodology used for estimating the aligned position, the same procedure is carried out for each phase in the energizing sequence. In this stage, the machine is run sensorless with the aligned position estimated in every energy conversion.

Upon estimation of the aligned position, the turn-on angle should be set a few mechanical degrees before the unaligned position, i.e., when the stator poles of that phase are at the point of least alignment with the rotor poles of the machine. In one exemplary embodiment, a timer could be used for measuring elapsed time between any two successive pulses from comparator 110 or 116 to determine the unaligned position relative to the aligned position. Once the unaligned position is determined, one can then estimate the flux-linkage at that unaligned position. It will be appreciated that the flux-linkage at the unaligned position comprises the minimum value in an entire electrical cycle. While the machine is driven sensorless, at least two measurements of position at different current levels at the unaligned position should be carried out to calculate the magnetization curve at the unaligned position, which is a straight line. See FIG. 2, wherein curve 122 represents an exemplary magnetization curve at the unaligned position.

It is noted that although in this stage the machine can run sensorless, the respective phases, however, are energized over the aligned position. As will readily understood by one skilled in the art, this could lead to generation of negative torque and would not be a very efficient method to drive the machine. Thus, this stage is temporarily used to obtain magnetization data of the machine at different current levels for the rotor positions to be identified by the algorithm, as explained in greater detail below.

Third stage: As suggested above, the concept of rotor position estimation, as contemplated in one aspect of the present invention, is based on the magnetization curve of the machine.

Figure 2:
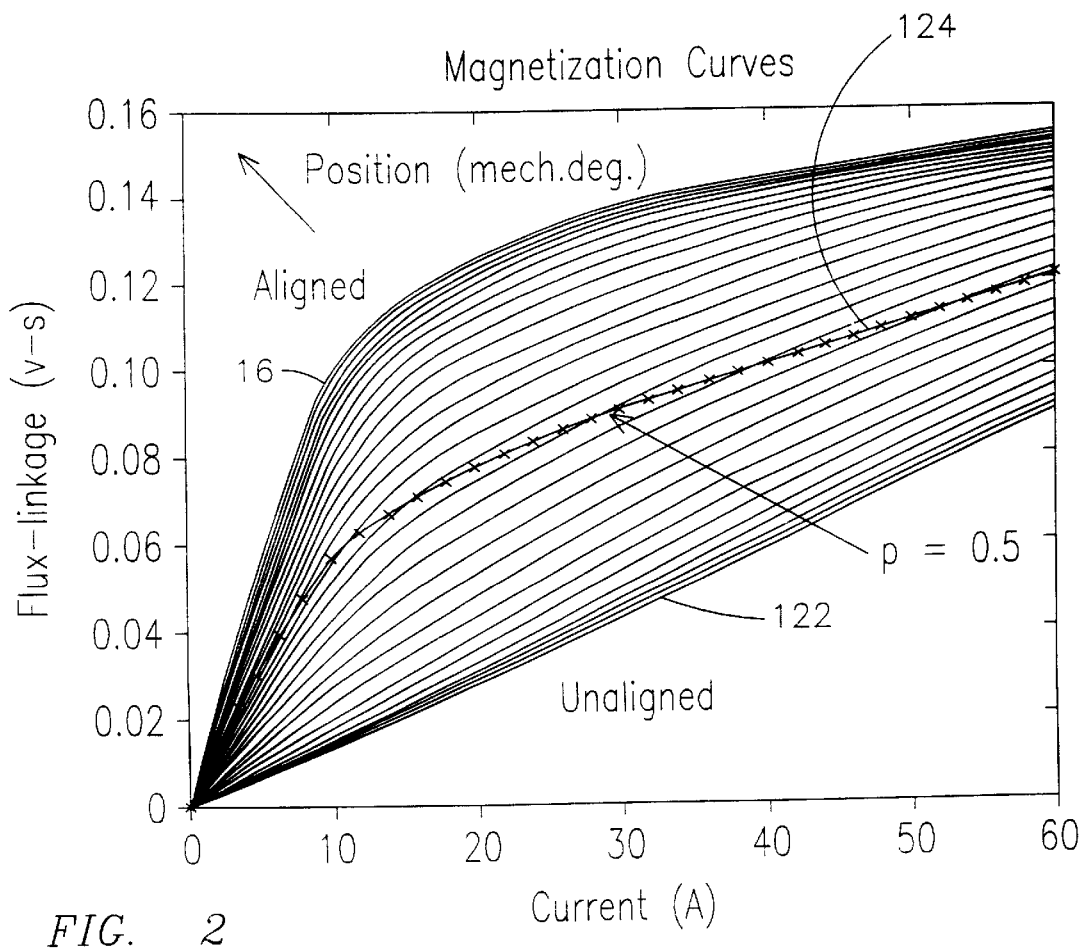
FIG. 2 illustrates respective plots of exemplary magnetization curves of a switched reluctance machine.

Exemplary magnetization curves of a switched reluctance machine are shown in FIG. 2. From the foregoing description, it will be appreciated that, at this stage of the algorithm, the respective magnetization curves corresponding to the aligned and unaligned positions have been determined. For example, as shown in FIG. 2, a magnetization curve 16 represents the curve for the excited phase when the stator poles of that phase are aligned with the respective rotor poles of the machine. A magnetization curve 122 represents the curve for the excited phase when the stator poles of that phase are at the point of least alignment with the rotor poles of the machine. In one exemplary embodiment, it is proposed to use as a reference an approximated magnetization curve 124 at an intermediate position. The new reference magnetization curve is calculated between the aligned and the unaligned position by eq. (2).

$$\psi_{ref}(p) = [(\psi_a - \psi_u) \cdot p + \psi_u]_{i=cnt} \qquad (2)$$

where $\psi_a$ and $\psi_u$ represent the respective flux-linkages at the aligned and the unaligned position respectively at a given current, and the factor p is a number chosen between $0 \leq p \leq 1$. In one exemplary embodiment, a value of factor p close to 0.5 is used because the sensitivity for rotor position estimation is believed to be the largest under this condition. It will be appreciated, however, that the present invention is not limited to any specific value of factor p. The reference magnetization curve 124 using p=0.5 is shown in FIG. 2 marked with the letter X.

From FIG. 2, it should be noted that the reference magnetization curve $\psi_{ref}$ does not represent a unique magnetization curve of the machine since curve 124 conceptually intersects with an infinite number of magnetization curves, better noticeable after the machine becomes saturated (e.g., above 10A in the case illustrated in FIG. 2). It should be further noted that the rotor position angle represented by reference magnetization curve 124 is a function of current, and the estimated angle tends to decrease as the current increases. This is better appreciated with the help of FIG. 3.

Figure 3:
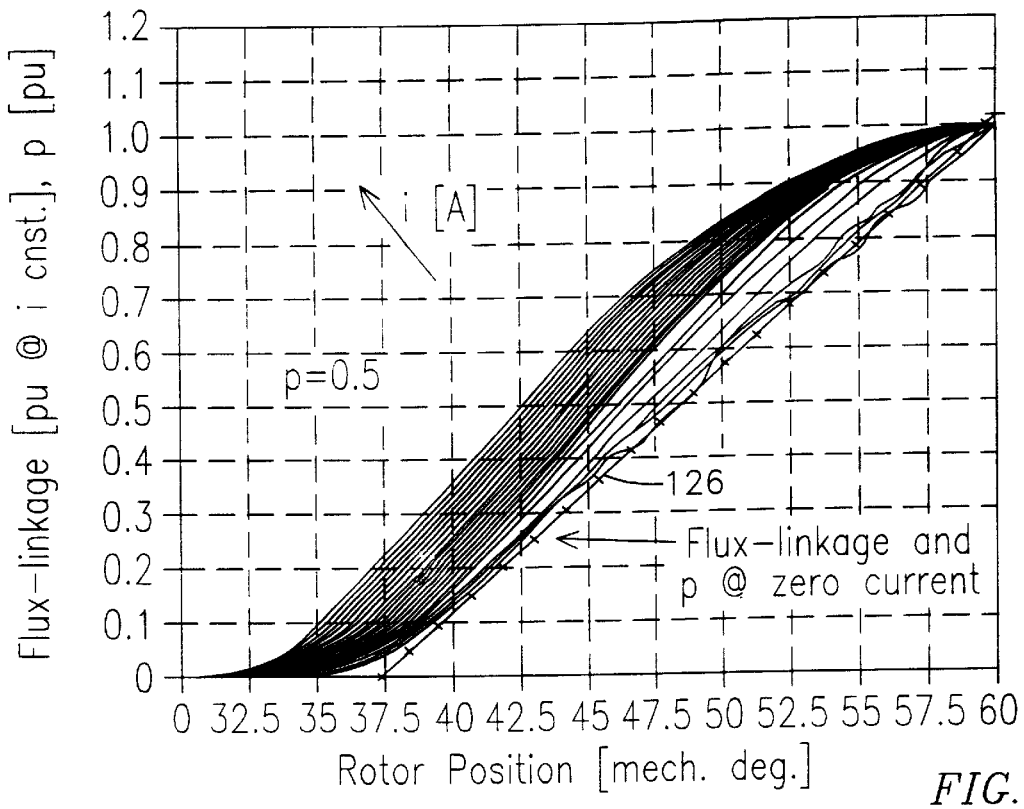
FIG. 3 illustrates respective plots of normalized flux-linkage as a function of rotor position.

FIG. 3 shows normalized flux-linkage curves as a function of rotor position. The flux-linkage is normalized at an intermediate position θ by eq. (3).

$$\psi_{nor}(\theta) = \left[\frac{\psi(\theta) - \psi_u}{\psi_a - \psi_u}\right]_{i=cnt} \quad (3)$$

Assuming p=0.5, this would correspond to a value of $\psi_{nor}$=0.5 (e.g. p=$\psi_{nor}$). In the exemplary representation shown in FIG. 3, if $\psi_{nor}$=0.5 is the reference for rotor position estimation, then the estimated rotor position would vary from about 48 to about 42.5 mechanical degrees as the value of the current increases.

The normalized flux-linkage and factor p at zero current can be calculated for a given machine geometry by eq. (4)

$$p(\theta) = \frac{\theta - \left[\theta_u + \frac{\beta_s + \beta_r}{2}\right]}{\text{Min}(\beta_s, \beta_r)}, \quad (4)$$

and through straightforward algebraic manipulation of eq. 4, rotor position θ as a function of factor p is determinable by eq. (5)

$$\theta(p) = \text{Min}(\beta_s, \beta_r) * p + \left[\theta_u + \frac{\beta_s + \beta_r}{2}\right] \quad (5)$$

where $\beta_s$ and $\beta_r$ are the stator and rotor pole arc, and $\theta_u$ represents the unaligned position, and Min($\beta_s$, $\beta_r$) represents selecting the smallest of $\beta_s$ and $\beta_r$. In one exemplary embodiment, the rotor position angle at zero current may be computed from eq. (5), and that angle may be used as an initial estimate of rotor position.

FIG. 3 shows an exemplary zero-current curve 126 calculated by eq. (5) and marked with the letter X.

Figure 4:
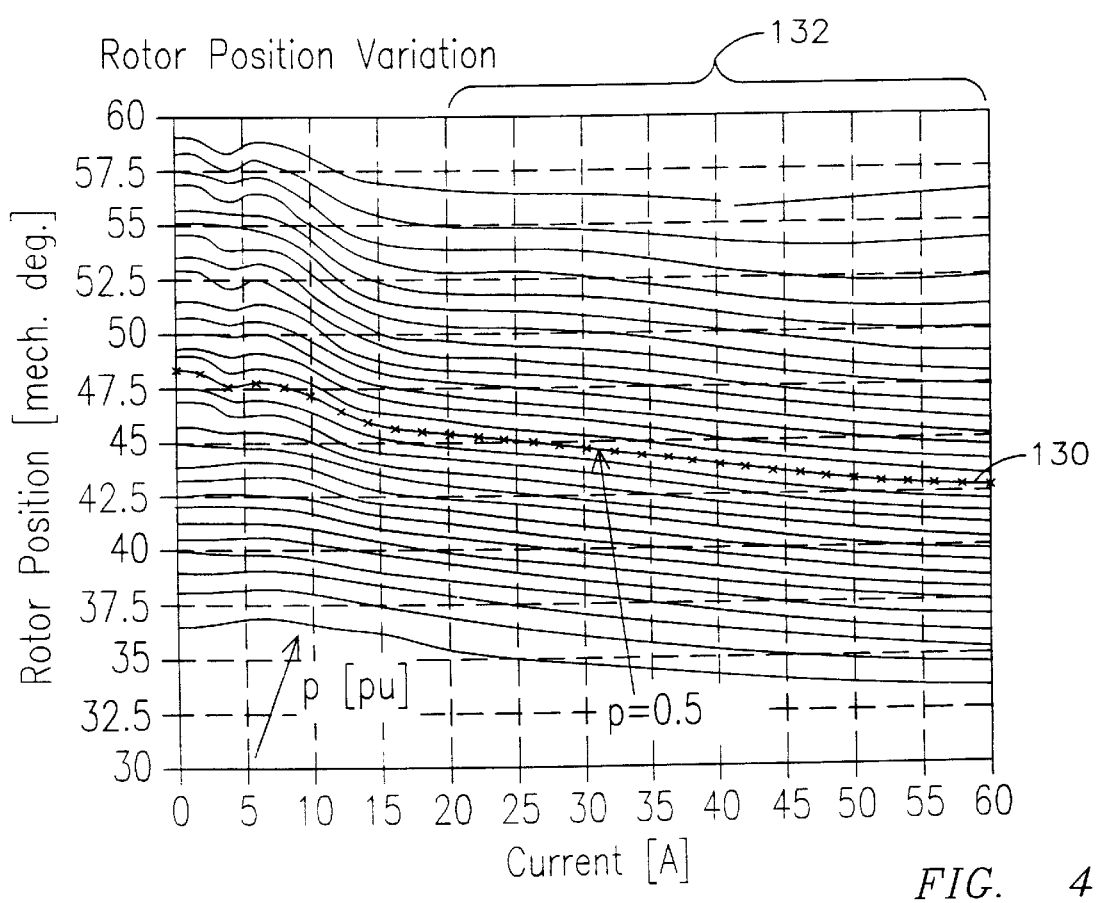
FIG. 4 illustrates respective plots of variation of the estimated rotor position as a function of phase current.

FIG. 4 shows exemplary variation in rotor position estimation as a function of current for a family or set of reference magnetization curves. As shown in FIG. 4, the family of magnetization values correspond to different values of factor p from 0 to 1 illustrated with an exemplary step of 1/30. A magnetization curve 130 marked with the letter X represents the curve with factor p=0.5. Note that the curves tend to be linear in a region, such as the region under bracket 132. In the exemplary illustration of FIG. 4, it can be shown that the slope is approximately constant for values of current above about 15A.

In order to calculate the variation in rotor position estimation as a function of current, the machine is run at least at two different current levels above the saturation current using the procedure discussed above in the context of the second stage of the algorithm. For each current level, the rotor position is calculated and a linear approximation is obtained for the variation in rotor position. In one exemplary embodiment, this action may be executed several times in order to calculate an average value of the rotor position.

Figure 5:
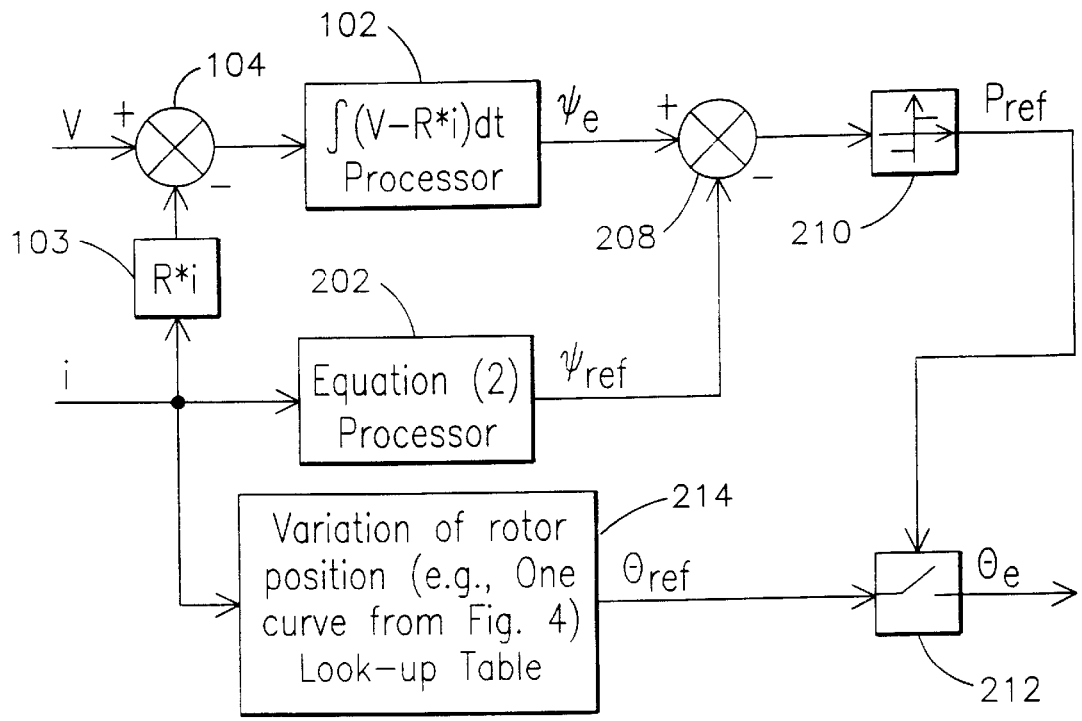
FIG. 5 illustrates a block diagram representation that may be used for practicing an exemplary embodiment that enables estimation of a single rotor position in accordance with one aspect of the present invention.

In one embodiment of the present invention, the proposed algorithm uses at least one reference magnetization curve, as may be calculated by eq. (2). An exemplary block diagram 200 of this embodiment is shown in FIG. 5. As suggested above, when a phase is energized, the current is measured and the voltage can be either measured or calculated from the switching signals. The flux-linkage $\psi_e$ is estimated in processor 102 configured to execute eq. (1), and the reference flux-linkage $\psi_{ref}$ is obtained from a processor 202 configured to execute eq. (2) at a given phase current. Alternatively, eq. (2) may be stored as a look-up table. A summer 208 is respectively coupled to processors 102 and 202 to generate a signal indicative of the difference $\psi_e - \psi_{ref}$. That difference is in turn coupled to a comparator 210 used to identify the reference magnetization curve $p_{ref}$. By way of example, initially the value of the difference $\psi_e - \psi_{ref}$ may be negative, but such difference eventually becomes zero when the reference magnetization curve has been reached and positive when the reference magnetization curve has been passed. A pulse is generated by comparator 210 upon detection of the sign change, or upon the value of the difference $\psi_e - \psi_{ref}$ reaching zero within any desired margin. A switch 212 is actuated by the pulse from comparator 210 to allow retrieval of a reference angle $\theta_{ref}$ from a look-up table 214. The reference angle $\theta_{ref}$ is obtained from look-up table 214 by using the phase current as an index to the table. After the reference magnetization curve $p_{ref}$ has been reached, the switch is enabled and the estimated rotor position is obtained $\theta_e = \theta_{ref}$. It will thus be appreciated that look-table 214 contains the rotor position variation as a function of current (FIG. 4).

Note that if only one reference magnetization curve is used then the resolution of the algorithm is one rotor position per energy conversion. However, the resolution of the algorithm increases with increased number of reference magnetization curves (p).

Figure 6:
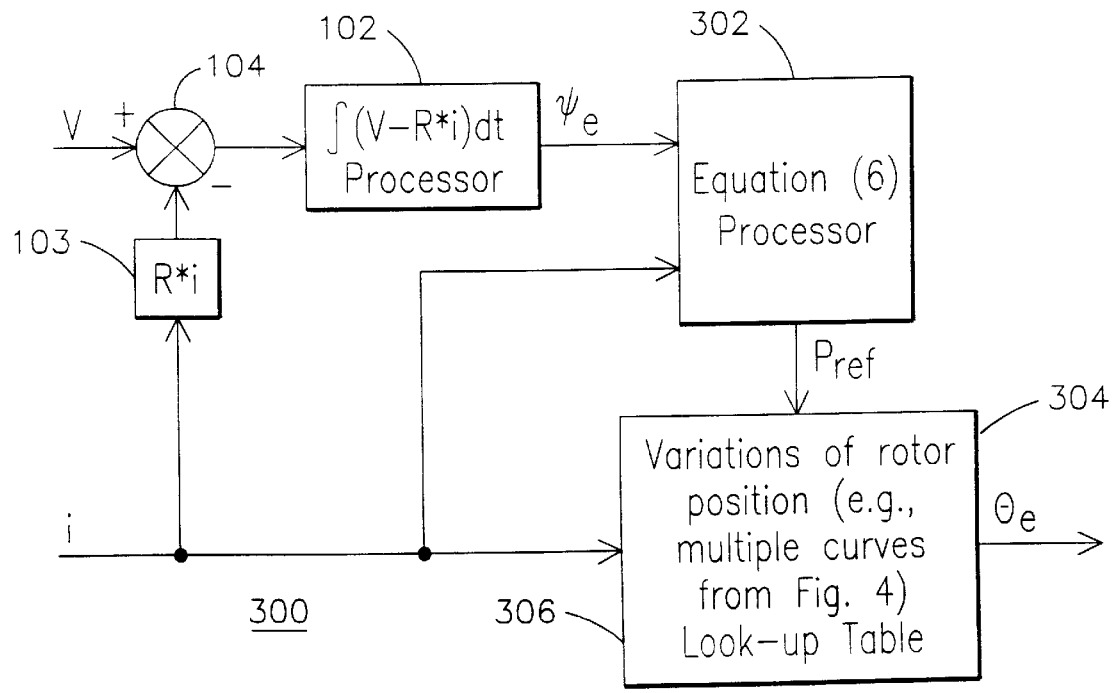
FIG. 6 illustrates a block diagram representation that may be used for practicing an exemplary embodiment that enables estimation of multiple rotor positions in accordance with another aspect of the present invention.

FIG. 6 shows a block diagram 300 of an embodiment that uses a set or family of reference magnetization curves. The flux-linkage ye is estimated as previously described using processor 102. A processor 302 is coupled to receive $\psi_e$ and the measured phase current to execute eq. (6) in order to generate the reference magnetization curve p. Alternatively, eq (6) may be stored as a look-up table. In this embodiment, a two-dimensional look-table 304 receives the output from processor, i.e, the reference magnetization curve p and the phase current as respective indexes from where the estimated position $\theta_e$ is calculated.

$$p_{ref} = \left[\frac{\psi_e - \psi_u}{\psi_a - \psi_u}\right]_{i=cnt} \quad (6)$$

At this point, the machine is driven sensorless using the new reference magnetization curve that allows to compensate for rotor variation as a function of current.

The present invention can be embodied in the form of microprocessor-implemented processes and apparatus for practicing those processes. The present invention can also be embodied in the form of microprocessor program code containing microprocessor-readable instructions embodied in tangible media, such as floppy diskettes, CD-ROMs, hard drives, or any other computer-readable storage medium, wherein, when the microprocessor program code is loaded into and executed by a microprocessor, the microprocessor becomes an apparatus for practicing the invention. When implemented on a microprocessor, the microprocessor program code segments configure the microprocessor to create specific logic circuits or processing modules.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method for estimating rotor position of a switched reluctance machine, said method comprising:

estimating flux linkage across a respective phase of the machine;

measuring magnetization curves at respective aligned and unaligned positions of the machine;

computing reference data between said aligned and unaligned positions based on the measured magnetization curves in accordance with the following equation:

$$\psi_{ref}(p)=[(\psi_a-\psi_u)\cdot p+\psi_u],$$

wherein $\psi_a$ and $\psi_u$ represent the respective flux linkage at the aligned and the unaligned positions respectively for the respective phase current, and p corresponds to a number having a value between $0 \leq p \leq 1$;

storing rotor position data based on said reference data, said stored rotor position data indicative of rotor position variation as a function of phase current;

relating the estimated flux linkage to said reference data to determine, for a respective phase current correspondence of the estimated flux linkage relative to the reference data; and retrieving stored rotor position data when said correspondence is determined, said retrieved rotor position data comprising the estimate of rotor position of said switch reluctance machine corresponding to the respective phase current.

2. The method of claim 1 wherein the step of computing reference data comprises generating a single reference curve corresponding to a single value of the number p.

3. The method of claim 2 wherein the step of storing rotor position data comprises storing rotor position data for said single reference carve, said rotor position data being indicative of rotor position variation as a function of phase current and said single value of the number p.

4. The method of claim 1 wherein the step of computing reference data comprises generating a family of reference curves corresponding to distinct values of the number p.

5. The method of claim 4 wherein the step of storing rotor position data comprises storing rotor position data for said family of reference curves, said rotor position data being indicative of rotor position variation as a function of phase current and said distinct values of the number p.

6. The method of claim 4 wherein the step of generating each reference curve $p_{ref}$ for said family of reference curves is based on the following equation:

$$p_{ref} = \left[\frac{\psi_e - \psi_u}{\psi_a - \psi_u}\right],$$

wherein $\psi_a$ and $\psi_u$ represent the respective flux linkages at the aligned and the unaligned positions respectively, and $\psi_e$ represents the estimated flux linkage, each at the respective phase current.

7. The method of claim 6 wherein the step of retrieving stored rotor position data further comprises retrieving stored rotor position data as a function of said distinct values of the number p, and wherein each retrieved rotor position data comprises distinct rotor position estimates of said switch reluctance machine corresponding to the respective phase current and respective ones of said family of reference cures.

8. The method of claim 1 wherein the step of estimating flux linkage comprises sensing a voltage V across a respective phase winding and calculating the phase flux-linkage based on the following equation:

$$\psi_e = \int (V-R^*i)dt,$$

wherein R comprises phase winding impedance and i comprises phase current.

9. The method of claim 1 wherein the step of estimating flux linkage comprises estimating a voltage V across a respective phase winding and calculating the phase flux-linkage based on the following equation:

$$\psi_e = \int (V-R^*i)dt,$$

wherein R comprises phase winding impedance and i comprises phase current.

10. A method for determining the aligned position of a switched reluctance machine, said method comprising:

estimating flux-linkage across a respective phase of the machine;

calculating the derivative of said flux-linkage; and determining said aligned position when the value of said flux-linkage derivative is within a predefined range about zero and/or said derivative changes sign.

11. A system for estimating rotor position of a switched reluctance machine, said system comprising:

a flux linkage estimator configured to estimate flux linkage across a respective phase of the machine;

a processor configured to measure magnetization curves at respective aligned and unaligned positions of the machine;

a processor configured to compute reference data between said aligned and unaligned positions based on said curves in accordance with the following equation:

$$\psi_{ref}(p)=[(\psi_a-\psi_u)\cdot p+\psi_u],$$

wherein $\psi_a$ and $\psi_u$ represent the respective flux linkage at the aligned and the unaligned positions respectively for the respective phase current, and p corresponds to a number having a value between $0 \leq p \leq 1$;

memory for storing rotor position data based on said reference data, said stored rotor position data indicative of rotor position variation as a function of phase current;

a flux-relating module configured to relate the estimated flux linkage to said reference data to determine, for a respective phase current, correspondence of the estimated flux linkage relative to the reference data; and a data retrieval unit coupled to said memory to retrieve stored rotor position data when said correspondence is determined, said retrieved rotor position data comprising the estimate of rotor position of said switch reluctance machine corresponding to the respective phase current.

12. The system of claim 11 wherein said processor is configured to generate a single reference curve corresponding to a single value of the number p.

13. The system of claim 12 wherein said memory is configured to store rotor position data for said single reference curve, said rotor position data being indicative of rotor position variation as a function of phase current and said single value of the number p.

14. The system of claim 11 wherein said processor is configured to generate a family of reference curves corresponding to distinct values of the number p.

15. The system of claim 14 wherein said memory is configured to store rotor position data for said family of reference curves, said rotor position data being indicative of rotor position variation as a function of phase current and said distinct values of the number p.

16. The system of claim 14 further comprising a processor configured to generate each reference curve $p_{ref}$ for said family of reference curves based on the following equation:

$$p_{ref} = \left[\frac{\psi_e - \psi_u}{\psi_a - \psi_u}\right],$$

wherein $\psi_a$ and $\psi_u$ represent the respective flux linkages at the aligned and the unaligned positions respectively, and $\psi_c$ represents the estimated flux linkage, each at the respective phase current.

17. The system of claim 16 wherein said data retrieval unit is configured to retrieve stored rotor position data as a function of said distinct values of the number p, and wherein each retrieved rotor position data comprises distinct rotor position estimates of said switch reluctance machine corresponding to the respective phase current and respective ones of said family of reference curves.

18. The system of claim 11 wherein said flux linkage estimator comprises a sensor configured to sense a voltage V across a respective phase winding and a calculator module configured to calculate said flux linkage based on the following equation:

$$\psi_e = \int(V - R*i)dt,$$

wherein R comprises phase winding impedance and i comprises phase current.

19. The system of claim 18 wherein said flux-relating module comprises a device configured to generate the difference between the estimated flux-linkage and a reference flux-linkage for the aligned position at the respective phase current.

20. The system of claim 19 wherein said flux-relating module further comprises a comparator configured to generate a pulse when the value of said difference is zero and/or within a predefined range about zero.

21. The system of claim 11 wherein said flux linkage estimator comprises an estimator configured to estimate a voltage V across a respective phase winding and a calculator module configured to calculate said flux linkage based on the following equation:

$$\psi_e = \int(V - R*i)dt,$$

wherein R comprises phase winding impedance and i comprises phase current.

22. The system of 11 wherein said flux-linkage estimator comprises a differentiator configured to generate the derivative of the estimated flux-linkage.

23. The system of 22 wherein said flux-estimator further comprises a comparator configured to generate a pulse when the value of said derivative is within a predefined range about zero and/or said derivative changes sign.

24. A computer-readable medium encoded with computer program code for estimating rotor position of a switched reluctance machine, the program code causing a computer to execute a method comprising:

estimating flux linkage across a respective phase of the machine;

measuring magnetization curves at respective aligned and unaligned positions of the machine;

computing reference data between said aligned and unaligned positions based on said curves in accordance with the following equation:

$$\psi_{ref}(p) = [(\psi_a - \psi_u) \cdot p + \psi_u],$$

wherein $\psi_a$ and $\psi_u$ represent the respective flux linkage at the aligned and the unaligned positions respectively for the respective phase current, and p corresponds to a number having a value between $0 \leq p \leq 1$;

storing rotor position data based on said reference data, said stored rotor position data indicative of rotor position variation as a function of phase current;

relating the estimated flux linkage to said reference data to determine, for a respective phase current, correspondence of the estimated flux linkage relative to the reference data; and retrieving stored rotor position data when said correspondence is determined, said retrieved rotor position data comprising the estimate of rotor position of said switch reluctance machine corresponding to the respective phase current.

25. The computer-readable medium of claim 24 wherein the step of computing magnetization reference data comprises generating a single reference curve corresponding to a single value of the number p.

26. The computer-readable medium of claim 25 wherein the step of storing rotor position data comprises storing rotor position data for said single reference curve, said rotor position data being indicative of rotor position variation as a function of phase current and said single value of the number p.

27. The computer-readable medium of claim 24 wherein the step of computing reference data comprises generating a family of reference curves corresponding to distinct values of the number p.

28. The computer-readable medium of claim 27 wherein the step of storing rotor position data comprises storing rotor position data for said family of reference curves, said rotor position data being indicative of rotor position variation as a function of phase current and said distinct values of the number p.

29. The computer-readable medium of claim 27 wherein the step of generating each reference curve $p_{ref}$ for said family of reference curves is based on the following equation:

$$p_{ref} = \left[\frac{\psi_e - \psi_u}{\psi_a - \psi_u}\right],$$

wherein $\psi_a$ and $\psi_u$ represent the respective flux linkages at the aligned and the unaligned positions respectively, and $\psi_e$ represents the estimated flux linkage, each at the respective phase current.

30. The computer-readable medium of claim 29 wherein the step of retrieving stored rotor position data further comprises retrieving stored rotor position data as a function of said distinct values of the number p, and wherein each retrieved rotor position data comprises distinct rotor position estimates of said switch reluctance machine corresponding to the respective phase current and respective ones of said family of reference curves.

31. The computer-readable medium of claim 24 wherein the step of estimating flux linkage comprises sensing a voltage V across a respective phase winding and calculating the phase flux based on the following equation:

$$\psi_e = \int (V - R*i)dt,$$

wherein R comprises phase winding impedance and i comprises phase current.

32. The computer-readable medium of claim 31 further comprising generating the difference between the estimated flux linkage and a reference flux linkage for the aligned position at the respective phase current.

33. The computer-readable medium of claim 32 further comprising generating a pulse when the value of said difference is within a predefined range about zero.

34. The computer-readable medium of 31 wherein said flux-relating step comprises generating the derivative of the estimated flux-linkage.

35. The computer-readable medium of 34 further comprising generating a pulse when the value of said derivative is within a predefined range about zero and/or said derivative changes sign.

36. A system for estimating rotor position of a switched reluctance machine, said system comprising:
    a flux linkage estimator configured to estimate flux linkage across a respective phase of the machine, wherein the flux linkage estimator comprises a differentiator configured to generate the derivative of the estimated flux linkage for determining an alignment position of the machine;
    a processor configured to measure magnetization curves at respective aligned and unaligned positions of the machine;
    a processor configured to compute reference data between said aligned and unaligned positions based on said curves;
    memory for storing rotor position data based on said reference data, said stored rotor position data indicative of rotor position variation as a function of phase current;
    a flux-relating module configured to relate the estimated flux linkage to said reference data to determine, for a respective phase current, correspondence of the estimated flux linkage relative to the reference data; and
    a data retrieval unit coupled to said memory to retrieve stored rotor position data when said correspondence is determined, said retrieved rotor position data comprising the estimate of rotor position of said switch reluctance machine corresponding to the respective phase current.

37. The system of claim 36 wherein the flux estimator further comprises a comparator configured to generate a pulse when the value of said derivative is within a predefined range about zero and/or said derivative changes sign.

38. A method for estimating rotor position of a switched reluctance machine, said method comprising:
    estimating flux linkage across a respective phase of the machine by sensing a voltage V across a respective phase winding and calculating the phase flux-linkage based on the following equation:

$$\psi_e = \int (V - R*i)dt,$$

wherein R comprises phase winding impedance and i comprises phase current;
    measuring magnetization curves at respective aligned and unaligned positions of the machine;
    computing reference data between said aligned and unaligned positions based on the measured magnetization curves in accordance with the following equation:

$$\psi_{ref}(p) = [(\psi_a - \psi_u) \cdot p + \psi_u],$$

wherein $\psi_a$ and $\psi_u$ represent the respective flux linkage at the aligned and the unaligned positions respectively for the respective phase current, and p corresponds to a number having a value between $0 \leq p \leq 1$;
    storing rotor position data based on said reference data, said stored rotor position data indicative of rotor position variation as a function of phase current;
    relating the estimated flux linkage to said reference data to determine, for a respective phase current, correspondence of the estimated flux linkage relative to the reference data; and
    retrieving stored rotor position data when said correspondence is determined, said retrieved rotor position data comprising the estimate of rotor position of said switch reluctance machine corresponding to the respective phase current.

39. The method of claim 38 wherein the step of estimating flux linkage comprises estimating a voltage V across a respective phase winding and calculating the phase flux-linkage based on the following equation:

$$\psi_e = \int (V - R*i)dt,$$

wherein R comprises phase winding impedance and i comprises phase current.

40. A system for estimating rotor position of a switched reluctance machine, said system comprising:
    a flux linkage estimator configured to estimate flux linkage across a respective phase of the machine wherein said flux linkage estimator comprises a sensor configured to sense a voltage V across a respective phase winding and a calculator module configured to calculate said flux linkage based on the following equation:

$$\psi_e = \int (V - R*i)dt,$$

wherein R comprises phase winding impedance and i comprises phase current;
    a processor configured to measure magnetization curves at respective aligned and unaligned positions of the machine;
    a processor configured to compute reference data between said aligned and unaligned positions based on said curves in accordance with the following equation:

$$_{ref}(p) = [(\psi_a - \psi_u) \cdot p + \psi_u],$$

wherein $\psi_a$ and $\psi_u$ represent the respective flux linkage at the aligned and the unaligned positions respectively for the respective phase current, and p corresponds to a number having a value between $0 \leq p \leq 1$;
    memory for storing rotor position data based on said reference data, said stored rotor position data indicative of rotor position variation as a function of phase current;
    a flux-relating module configured to relate the estimated flux linkage to said reference data to determine, for a respective phase current, correspondence of the estimated flux linkage relative to the reference data; and a data retrieval unit coupled to said memory to retrieve stored rotor position data when said correspondence is determined, said retrieved rotor position data comprising the estimate of rotor position of said switch reluctance machine corresponding to the respective phase current.

41. The system of claim 40 wherein said flux linkage estimator comprises an estimator configured to estimate a voltage V across a respective phase winding and a calculator module configured to calculate said flux linkage based on the following equation:

$$\psi_e = \int (V - R^* i) dt,$$

wherein R comprises phase winding impedance and i comprises phase current.

42. The system of claim 40 wherein said flux-relating module comprises a device configured to generate the difference between the estimated flux-linkage and a reference flux-linkage for the aligned position at the respective phase current.

43. The system of claim 42 wherein said flux-relating module further comprises a comparator configured to generate a pulse when the value of said difference is zero and/or within a predefined range about zero.

44. The system of 40 wherein said flux-linkage estimator module comprises a differentiator configured to generate the derivative of the estimated flux-linkage.

45. The system of 44 wherein said flux-estimator module further comprises a comparator configured to generate a pulse when the value of said derivative is within a predefined range about zero and/or said derivative changes sign.

46. A computer-readable medium encoded with computer program code for estimating rotor position of a switched reluctance machine, the program code causing a computer to execute a method comprising:

estimating flux linkage across a respective phase of the machine by sensing a voltage V across a respective phase winding and calculating the phase flux based on the following equation:

$$\psi_e = \int (V - R^* i) dt,$$

wherein R comprises phase winding impedance and i comprises phase current;

measuring magnetization curves at respective aligned and unaligned positions of the machine;

computing reference data between said aligned and unaligned positions based on said curves in accordance with the following equation:

$$\psi_{ref}(p) = [(\psi_a - \psi_u) \cdot p + \psi_u],$$

wherein $\psi_a$ and $\psi_u$ represent the respective flux linkage at the aligned and the unaligned positions respectively for the respective phase current, and p corresponds to a number having a value between $0 \leq p \leq 1$;

storing rotor position data based on said reference data, said stored rotor position data indicative of rotor position variation as a function of phase current;

relating the estimated flux linkage to said reference data to determine, for a respective phase current, correspondence of the estimated flux linkage relative to the reference data; and retrieving stored rotor position data when said correspondence is determined, said retrieved rotor position data comprising the estimate of rotor position of said switch reluctance machine corresponding to the respective phase current.

47. The computer-readable medium of claim 46 further comprising generating the difference between the estimated flux linkage and a reference flux linkage for the aligned position at the respective phase current.

48. The computer-readable medium of claim 47 further comprising generating a pulse when the value of said difference is within a predefined range about zero.

49. The computer-readable medium of 46 wherein said flux-relating step comprises generating the derivative of the estimated flux-linkage.

50. The computer-readable medium of 49 further comprising generating a pulse when the value of said derivative is within a predefined range about zero and/or said derivative changes sign.

* * * * *